United States Patent [19]
Coes

[11] Patent Number: 4,763,603
[45] Date of Patent: Aug. 16, 1988

[54] DISPOSABLE CONTAINER FOR CAT LITTER AND THE LIKE

[76] Inventor: Cecil Coes, 6830 Elwynn Dr., Cincinnati, Ohio 45236

[21] Appl. No.: 8,483

[22] Filed: Jan. 29, 1987

[51] Int. Cl.$^4$ .............................................. A01K 45/00
[52] U.S. Cl. ....................................................... 119/1
[58] Field of Search .................... 119/1; 220/403, 404, 220/408

[56] References Cited

U.S. PATENT DOCUMENTS

| | | | |
|---|---|---|---|
| 1,386,374 | 8/1921 | Smith . | |
| 3,227,137 | 1/1966 | Goldman et al. | 119/1 |
| 3,684,155 | 8/1972 | Smith | 229/14 B |
| 3,886,901 | 6/1975 | Zeitter | 119/1 |
| 3,890,930 | 6/1975 | Clark | 119/1 |
| 4,156,400 | 5/1979 | Migdal | 119/1 |
| 4,164,314 | 8/1979 | Edgar | 229/33 |
| 4,271,787 | 6/1981 | Wellman et al. | 119/1 |
| 4,541,360 | 9/1985 | Higgins et al. | 119/1 |
| 4,548,160 | 10/1985 | Feitelson | 119/1 |
| 4,553,671 | 11/1985 | Cheesman | 206/611 |
| 4,648,349 | 3/1987 | Larson | 119/1 |

FOREIGN PATENT DOCUMENTS

| | | | |
|---|---|---|---|
| 2754620 | 6/1979 | Fed. Rep. of Germany | 119/1 |
| 8604777 | 8/1986 | Fed. Rep. of Germany | 119/1 |

*Primary Examiner*—Robert P. Swiatek
*Assistant Examiner*—Joyce M. Britt
*Attorney, Agent, or Firm*—Frost & Jacobs

[57] ABSTRACT

There is provided a disposable container for cat litter and the like having a bottom wall, a pair of oppositely disposed inside end walls and a pair of oppositely disposed inside side walls, with such inside and end side walls forming an upstanding, substantially continuous inner closure wall about the periphery of the bottom wall. The container further includes a pair of oppositely disposed outside end walls and a pair of oppositely disposed outside side walls, with such outside end and side walls corresponding to the inside end and side walls and forming an upstanding substantially continuous outer enclosure wall about the outer periphery of the inner enclosure wall, thereby forming a substantially open top, box-like structure with the bottom wall. A bag-like moisture proof structure having an open upper edge, a closed lower end, and flexible side walls is integrally placed within such box-like structure such that its closed lower end covers the bottom wall therewithin, and the flexible side walls and open upper edge are disposed between the inner and outer enclosure walls about the periphery of the bottom wall. A removable tear-tape for opening the outer enclosure wall is preferably provided, whereby the open upper edge and upper portions of the flexible side walls of the bag-like structure may be withdrawn about the periphery of the open top to provide a moisture proof enclosure of the container and its contents.

20 Claims, 4 Drawing Sheets

DISPOSABLE CONTAINER FOR CAT LITTER AND THE LIKE

TECHNICAL FIELD

This invention relates to a disposable container for cat litter and the like, and, more particularly to a disposable container which includes a moisture proof bag-like structure integrally formed therewith to provide convenient and sanitary disposal of the container following use.

BACKGROUND ART

There are many applications in which a container is designed to provide a partial or full enclosure of a particular substance during use, and after which the container and the enclosed material must be further handled or disposed of. For example, a great many people maintain cat litter boxes in their homes which, of course, contain a predetermined amount of cat litter and which must be periodically cleaned and/or disposed of. Other examples include containers in which limited amounts of plaster or other messy, and possibly dangerous, materials are mixed prior to being used elsewhere. Following such uses, these various containers must either be cleaned for further use or for storage, or disposed of. In particular, in instances where the container is soiled following use and contains substances which the user would rather not come into contact with, the cleaning or disposal procedure can be inconvenient, messy, and in some instances hazardous.

In particular, when dealing with soiled cat litter containers, the safety of the user's health can be compromised by unnecessary handling of the container and its soiled contents. In fact, it has been found that Toxoplasmosis, an infection caused by the protozoan *Toxoplasmosis Gondii,* can be transmitted through direct or indirect contact with cat feces. Toxoplasmosis is a disorder which can effect various physiological systems of the body, including the pulmonary, digestive and cardio-vascular systems. Human infection follows hand-to-mouth contact, such as after disposal of soiled cat litter. Cats are the predominant hosts for this infectious organism, and the disease is highly contagious. While the disorder is generally asymptomatic in otherwise healthy adults, Toxoplasmosis is especially dangerous in pregnant women, as there is a great risk that the disorder will be transmitted to the fetus. In this regard, the disorder can cause fetal disease during any stage of pregnancy, and can cause serious perinatal mortality and morbidity, including multiple birth defects such as mental retardation, spasticity, palsies, impaired vision and deafness.

Although thorough hand washing helps avoid transmission of the disorder by cleaning away the infective oocysts, such hygiene is not nearly as safe as avoiding contact with the cat litter completely.

Containers now available in the industry fail to include features which provide for convenient and sanitary handling of such soiled containers. Therefore, despite the widepread need for containers which feature such characteristics, heretofore there has been no such container available.

DISCLOSURE OF THE INVENTION

It is an object of this invention to obviate the above-described problems.

It is another object of the present invention to provide an economical disposable container which features integral disposal means permitting sanitary and convenient disposal of the container following use.

In accordance with one aspect of the present invention, there is provided a disposable container for cat litter and the like having a bottom wall, a pair of oppositely disposed inside end walls and a pair of oppositely disposed inside side walls, with such inside end and side walls forming an upstanding, substantially continuous inner closure wall about the periphery of the bottom wall. The container further includes a pair of oppositely disposed outside end walls and a pair of oppositely disposed outside side walls, with such outside end and side walls corresponding to the inside end and side walls and forming an upstanding substantially continuous outer enclosure wall about the outer periphery of the inner enclosure wall, thereby forming a substantially open top, box-like structure with the bottom wall. A bag-like moisture proof structure having an open upper edge, a closed lower end, and flexible side walls is integrally placed within such box-like structure such that its closed lower end covers the bottom wall therewithin and the flexible side walls and open upper edge are disposed between the inner and outer enclosure walls about the periphery of the bottom wall. Access means for opening the outer enclosure wall are provided, whereby the open upper edge and upper portions of the flexible side walls of the bag-like structure may be withdrawn about the periphery of the open top to provide a moisture proof enclosure of the container and its contents.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF THE INVENTION

Figure 1:
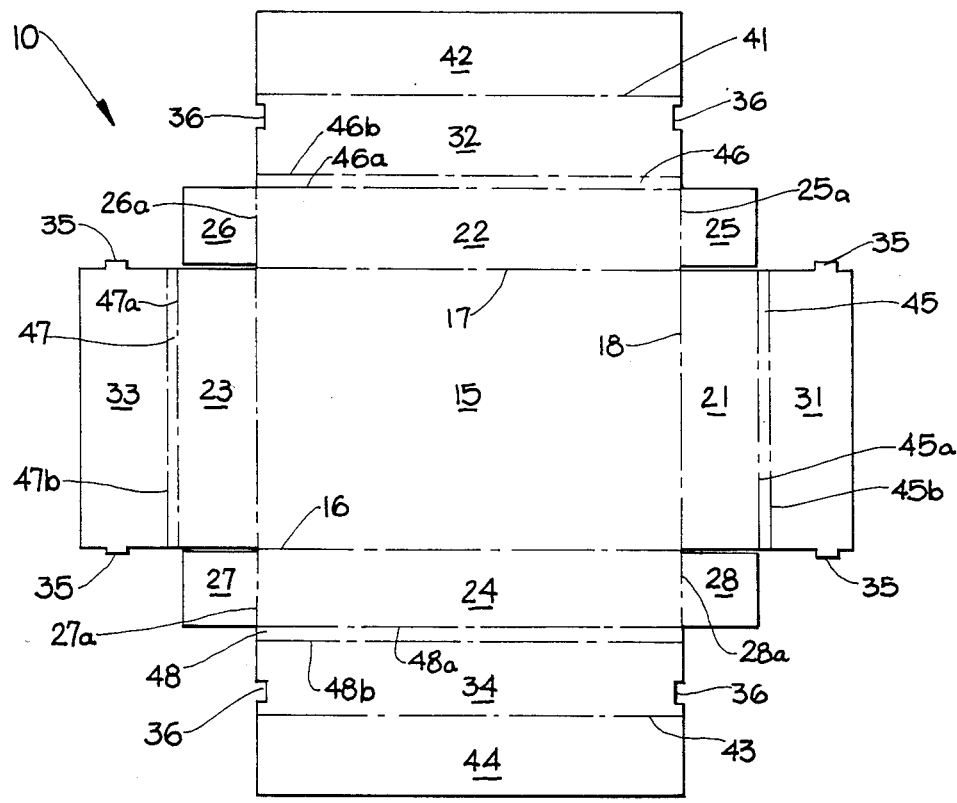
FIG. 1 is a top plain view of the inner surface of a blank from which an embodiment of the box-like structure of the subject invention can be formed.

Referring now to the drawings in detail, wherein like numerals indicate the same elements throughout the views, FIGS. 1 through 5 illustrate a preferred embodiment of the disposable container of the subject invention. In particular, FIG. 1 illustrates a top plain view of the inner surface of a blank from which the box-like structure of the subject invention can be formed. Blank 10 is preferably formed from standard container board, cardboard, paperboard, or the like, to provide an economical and sturdy container structure. The choice of material for blank 10 is not critical, however, as any substantially sturdy material could be utilized.

Blank 10 comprises a bottom wall 15 having a substantially rectangular conformation with oppositely disposed front and rear edges (16 and 17, respectively) and oppositely disposed side edges (18 and 19, respectively). Hingedly attached along side edges 18 and 19 are a pair of oppositely disposed outside side walls 21 and 23, respectively. Similarly, hingedly attached along the front and rear edges 16 and 17 are front end wall 24 and rear end wall 22, respectively. Front end wall 24 is shown as including a pair of oppositely disposed corner locking flaps 27 and 28 hingedly attached along its lateral edges, and rear end wall 22 is similarly shown as including corner locking flaps 25 and 26. As will be described in greater detail below, locking flaps 25 through 28 provide means for securing and supporting the inside and outside end and side walls in upright position to provide outer and inner closure walls about the periphery of bottom panel 15. Locking flaps 25 through 28 are shown only as an example of a preferred manner for providing additional support at the corners of a container of the subject invention. Other means for securing the closure walls in upright position might include reinforcing the corners with tape or the like. It is contemplated that these locking flaps could equally depend from side walls 21 and 23, respectively.

Hingedly attached along the outer distal edge (i.e. 45a) of outside side wall 21 is inside right side wall 31. As it is preferred that there be some space provided between outside side wall 21 and inside side wall 31 in the completed container formed from blank 10, a bend or spacer panel 45 is provided between the fold lines 45a and 45b. As will be seen in greater detail below, the resulting space formed between the corresponding peripheral enclosure walls of the resulting container will facilitate the placement of a bag-like moisture proof structure therebetween. Inside rear end wall 32 is hingedly connected along the distal edge of outside rear end wall 22 by bend panel 46 formed between spaced fold lines 46a and 46b, respectively. Correspondingly, inside left side wall 33 is hingedly connected to outside left side wall 23 by bend panel 47, and inside front end wall 34 is hingedly connected to outside front end wall 24 by bend panel 48. The width of bend panels 45 through 48 can, of course, vary as desired and in accordance with space requirements for the moisture proof structure to be located between the corresponding enclosure walls.

Inside side walls 31 and 33 are further shown as including a pair of oppositely disposed, outwardly extending locking tabs 35 adjacent the outer portion of their front and rear edges, respectively. As will be seen, these locking tabs are designed to lockingly engage corresponding slots or notches 36 formed adjacent the outer portion of the side edges of front and rear inside end walls 34 and 32, respectively. This tab/slot arrangement is included merely as an example of a means to help maintain inside side walls 31 and 33 and front and rear end walls 34 and 32, respectively, in their substantially upstanding condition about the periphery of bottom wall 15 when box-like structure 60 (see FIG. 4) is erected. While this locking arrangement is preferred, for added container rigidity, it is not critical to accomplishing the unique features of the subject invention.

Hingedly attached along the outer distal edge (i.e. along fold or score line 43) of inside front end wall 34 is front inner bottom wall panel 44. A corresponding rear inner bottom wall panel 42 is hingedly attached along fold line 41 to the outer distal edge of inside rear end wall 32. Again, while it is preferred that such inner bottom wall panels be included in blank 10, the disposable container of the present invention need not include such an inner bottom wall panel.

Figure 2:
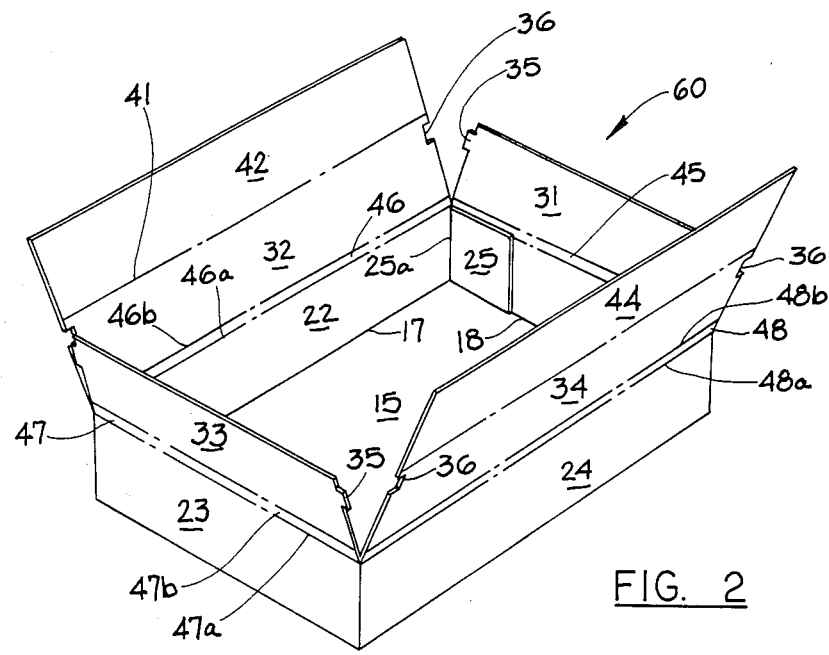
FIG. 2 is a perspective view of the blank of FIG. 1 shown in partially erected condition.

As illustrated in FIG. 2, the open-top box-like structure 60 is erected from blank 10 by first folding corner locking flaps 25, 26, 27 and 28 upwardly 90° about fold lines 25a, 26a, 27a and 28a, respectively. Adhesive is preferably applied to the outer surface of corner locking flaps 25 through 28, and, thereafter, front and rear end walls 24 and 22, respectively, are folded upwardly about transverse fold lines 16 and 17, respectively. Outside right side wall 21 and outside left side wall 23 can then be folded upwardly about fold lines 18 and 19, respectively, and adhesively attached to the outer surfaces of corner locking flaps 25 and 28, and 26 and 27, respectively. FIG. 2 illustrates the partially erected container as it would appear after these steps have been accomplished.

Figure 3:
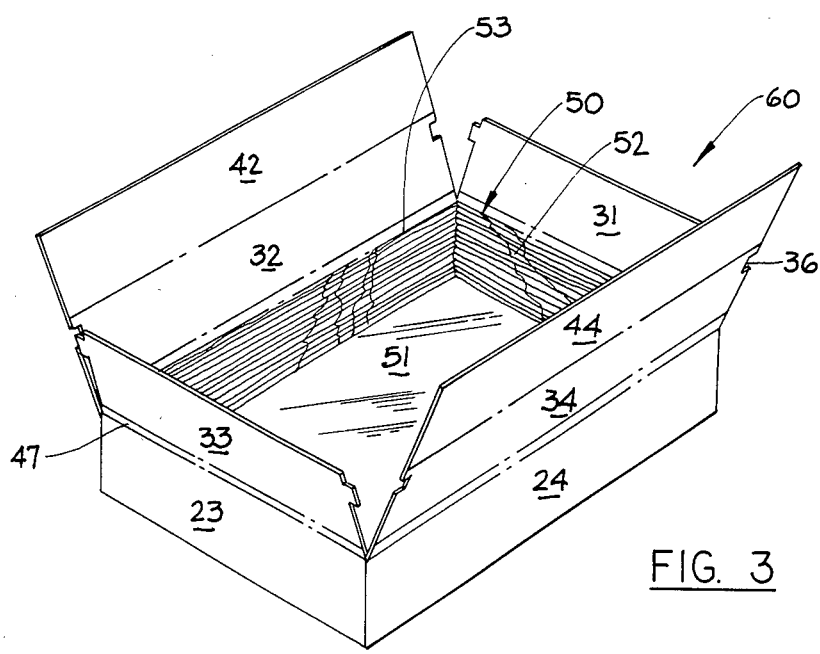
FIG. 3 is a perspective view of the partially erected box-like structure of FIG. 2, wherein the bag-like moisture proof structure of the subject invention has been placed within the partially completed box-like structure prior to the final folding procedures.

It is at this stage of assembly of container 60 that it is preferred to place the bag-like moisture proof structure 50 within the partially erected container 60. FIG. 3 illustrates the partially erected container 60 following placement therewithin of bag-like structure 50. In particular, bag-like structure 50 is preferably a thin-walled structure formed of flexible polyethylene, mylar, or similar moisture proof material. For example, an appropriately sized bag-like structure similar to a common trash bag having a thickness of approximately 1 mil would be advantageously utilized as moisture proof structure 50. Bag-like structure 50 is to have a closed lower end 51, flexible side walls 52, and an open upper edge 53. Closed lower end 51 is to be placed over the inner surface of bottom wall 15, with the flexible side wall 52 and open upper edge 53 disposed about the inner periphery of the outer enclosure wall formed by upstanding side walls 21 and 23, and end walls 22 and 24, respectively. To ensure that moisture proof structure 50 maintains its proper position within disposable container 60, it is preferred that at least portions of closed lower end 51 be substantially immovably attached to the inner surface of bottom wall 15, such as by adhesive or the like. Following placement of bag-like structure 50 within the partially erected container 60, the erection procedures can be completed.

Bend panels 46 and 48 are formed by folding inside end walls 34 and 32 inwardly about fold lines 48a and b, and 46a and b, respectively. As inner end walls 34 and 32 are folded inwardly into the partially erected container 60, they enclose portions of the bag-like structure 50 between corresponding front walls 24 and 34, and between corresponding rear walls 22 and 32, respectively. At the same time, as inside front wall 34 is folded into parallel relationship with outer front wall 24, front inner bottom wall 44 necessarily comes into contact with the upper surface of the closed lower end 51 of moisture proof structure 50 which is covering bottom wall 15, and transverse fold line 43 is forced inwardly toward parallel fold line 16. In this way, front inner bottom wall 44 forms part of an inner bottom wall surface covering the bag-like structure 50 over bottom wall 15.

Correspondingly, inside rear end wall 32 is folded inwardly into substantially parallel relationship with outside rear end wall 22, and rear inner bottom wall 42 is folded about transverse fold line 41 to form the rear portion of the inner bottom wall surface covering bag-like structure 50 over bottom wall 15. While it is not critical that such inner bottom wall panels be included in blank 10, they are preferred to form an inner bottom wall surface which helps to protect bag-like structure 50 from damage which might compromise its moisture proof characteristics. Thereafter, inside right side wall 31 is folded inwardly about fold lines 45a and b, thereby enclosing bag-like structure 50 between the right side walls. As inside right side wall 31 is folded inwardly, its outwardly extending locking tabs 35 will eventually be pushed into locking engagement with corresponding slots 36 to help maintain end side wall panels 31, 32 and 34 in place. Similarly, inside left side wall 33 is folded inwardly about fold lines 47a and b, and its outwardly extending locking tabs 35 interlock with the corresponding slots 36 of panels 32 and 34 to help maintain inner wall panels 32, 33 and 34 in proper position such that an inner enclosure wall is formed about the periphery of bottom wall panel 15.

As indicated above, the locking tab/slot arrangement is preferred to help positively hold such inner wall panels in place. This specific structure, however, is not critical and could equally be accomplished by other means. For example, one could rely on the frictional forces between the interacting edges of the various wall panels with each other to maintain the same in their desired positions. Similarly, other interlocking arrangements could be accomplished by one skilled in the art.

It is preferred that a minimum of adhesive be utilized to erect container 60 in order to ensure that the flexible side walls 52 and open upper edge 53 of bag-like structure 50, which is enclosed within the inner and outer enclosure walls of the resulting container, remain substantially freely movable for subsequent withdrawal through access means formed in the outer enclosure wall, as will be described in greater detail below.

Figure 4:
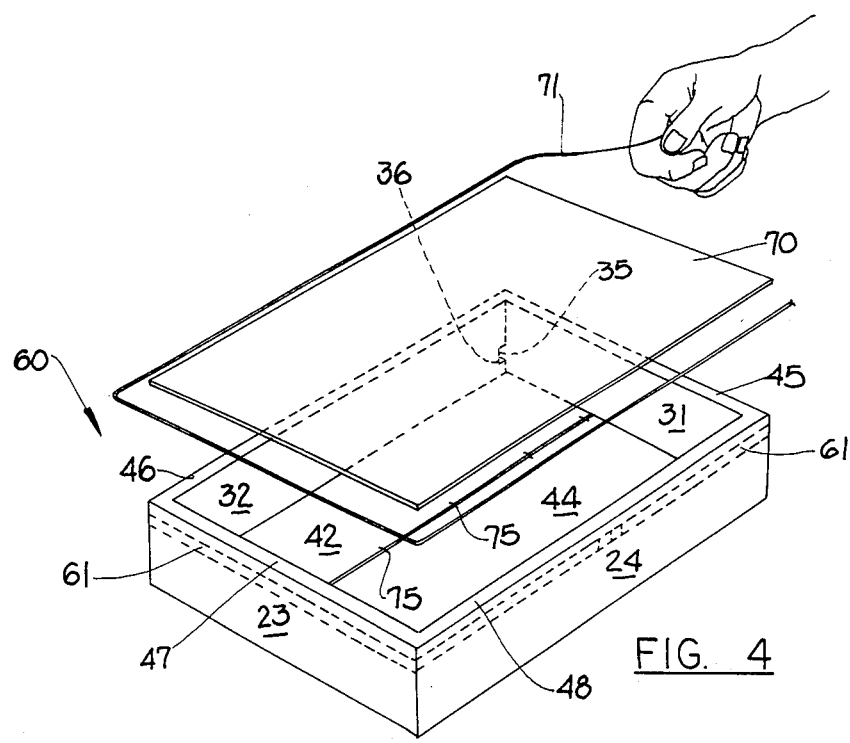
FIG. 4 is an exploded perspective view of the box-like structure of FIG. 3, shown following the final folding procedures and further illustrating a removable lid structure for such container and pull-string means for facilitating removal of such lid structure.

FIG. 4 illustrates a completed container 60 which encloses bag-like structure 50 within its walls. FIG. 4 also illustrates a removable lid structure 70 which may be attached about the upper periphery of the open top of container 60 in order to enclose a predetermined amount of cat litter or similar material which may be packaged within container 60. Removable lid 70 may also be provided with means such as pull string 71 to facilitate its removal. Other similar means (e.g. perforations about the outer periphery) might alternately be utilized to provide for the easy removal of lid 70.

Figure 5:
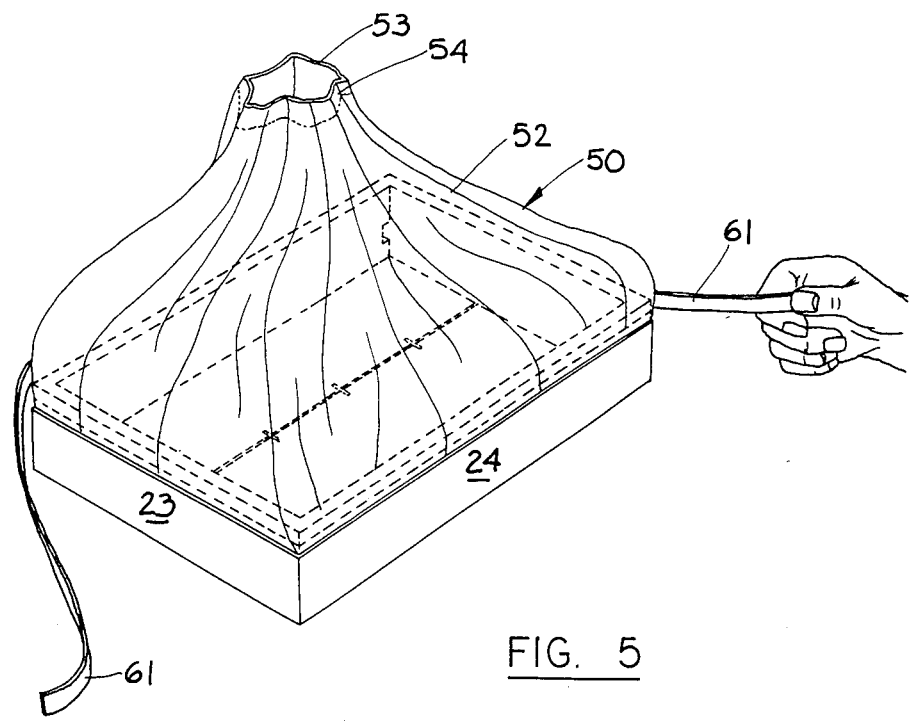
FIG. 5 is a perspective view of the open-top container of FIG. 4, and further illustrating utilization of access means for opening the outer enclosure wall of the box-like structure to permit the upper edge and upper portions of the flexible sidewalls of the bag-like structure to be withdrawn about the periphery of the open top of the container.

It should be noted that outside front end wall 24 and outside side wall 23 are shown as including perforated tear tab means 61. It is contemplated that tear tab means 61 are to be formed about the upper portions of outer walls 21, 22, 23 and 24 to provide a substantially continuous tear-out strip or access means for opening the outer enclosure wall of container 60, whereby (as illustrated in FIG. 5) the open upper edge 53 and upper portions of flexible side walls 52 of bag-like structure 50 may be withdrawn about the periphery of the open top of container 60, thereby providing a moisture proof enclosure of container 60 and its contents. While exact dimensions of bag-like structure 50 will vary between applications, it will be understood that flexible side walls 52 are to be of sufficient length to permit withdrawal thereof about the periphery of container 60, and convenient closure over the open top of such container, thereby effectively enclosing the inner portions of the container and the cat litter or other material held therewithin. As also illustrated in FIG. 5, it is contemplated that the upper margin 54 of the flexible side walls 52 (e.g. the upper 3 to 5 cm) adjacent upper edge 53 could conveniently be perforated or otherwise weakened for removal and use as a tie device for bag-like structure 50. Similarly, a twist tie device (not shown) could alternately be used to tie the bag-like structure 50 closed for disposal.

It is contemplated that the disposable container described herein can be advantageously used as a container for cat litter and the like. Container 60 could be provided to the consumer in either its open form (as an item separate from the cat litter itself), or as a complete package including a predetermined amount of cat litter enclosed by a removable lid (e.g. removable lid 70). The container could thereby function as a double-walled litter box having a moisture proof liner formed therewithin. In this regard, it is also contemplated that the material from which blank 10 is formed could also be sprayed or otherwise treated with a moisture proof coating to enchance the moisture retention characteristics of container 60. Such coating of blank 10 might be preferred to prevent migration of moisture and liquid materials along the surface of a container used in this way. In this regard, the exact dimensions of the panels of a blank made in accordance herewith will be determined by the application requirements of the container to be formed therefrom. For example, if container 60 is to be used as a cat litter box, the height of inside side and end walls 31 through 34 might preferably be about 5 inches (about 12.7 cm) to conveniently contain 3 to 4 inches (about 7.6 to about 10.2 cm) of cat litter material therewithin.

Following use of container 60 for a period of time, the cat litter or similar material contained therewithin will become soiled and appropriate for disposal. When disposal is desired, the consumer need only utilize the access means (e.g. remove tear tab 61) about the upper periphery of the outer enclosure wall of container 60, thereby providing access to the open upper edge 53 of bag-like structure 50. Open upper edge 53 and the upper portions of flexible side walls 52 are then withdrawn about the periphery of the open top of container 60 such that open upper edge 53 may be closed by use of a conventional twist tie or other similar closure means (e.g. removable margin 54) for disposal, as mentioned above. It should be noted that tear tab 61 is shown only as a preferred example of means to provide access for opening the outer enclosure wall so that bag-like structure 50 can be withdrawn for disposal procedures. Any similar access means for conveniently opening the outer enclosure wall of container 60 could equally be incorporated. It can therefore be seen that the subject invention provides a double-walled container having a moisture proof liner in use, and wherein the flexible sidewalls and open upper edge of the moisture proof liner structure can be withdrawn about the open top of the container for convenient and sanitary disposal of the container and its contents.

Figure 6:
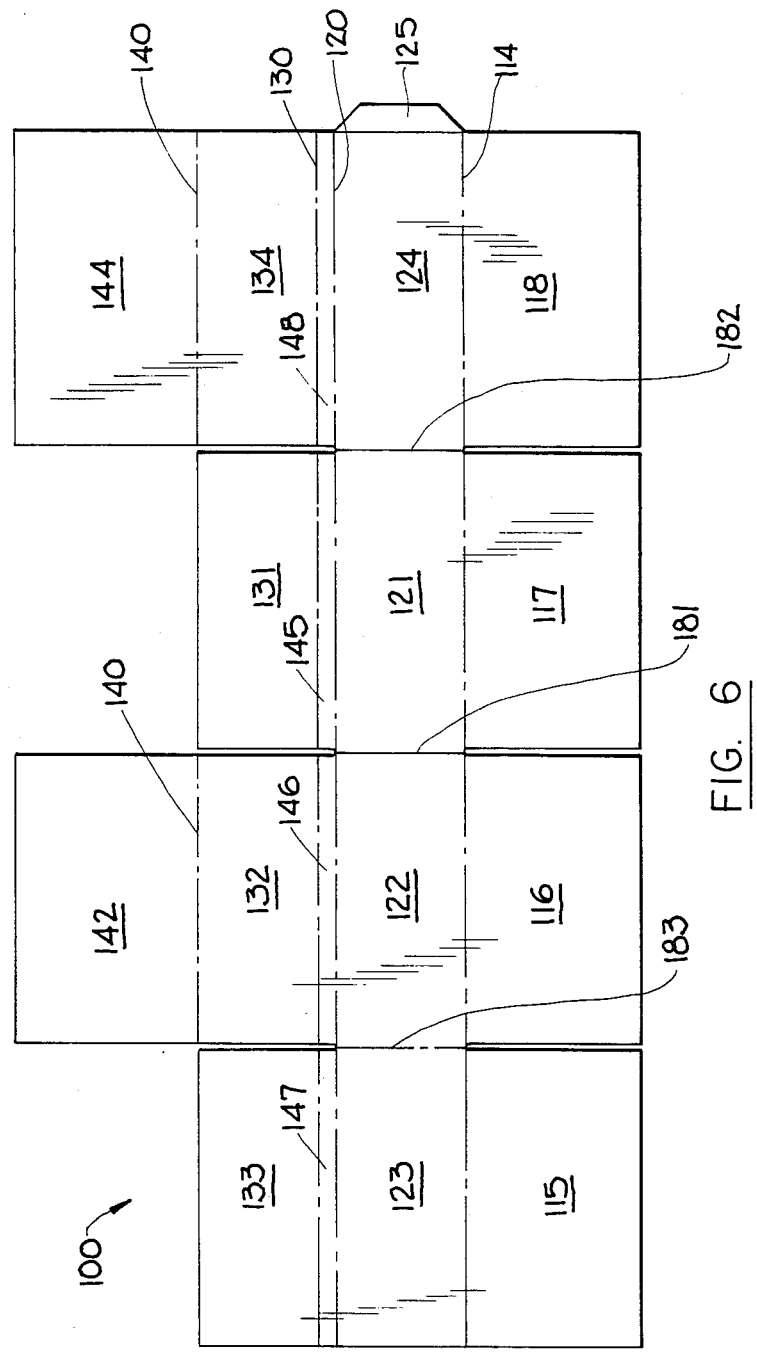
FIG. 6 is a top plain view of the inner surface of an alternate blank from which the box-like structure of the subject invention can be formed.

FIG. 6 illustrates an alternate embodiment of the subject disposable container. In particular, FIG. 6 illustrates the inner surface of blank 100 having outer bottom flaps 116 and 118, and inner bottom flaps 115 and 117, respectively. These overlapping bottom flaps would provide a dual thickness bottom wall corresponding to bottom wall 15 of blank 10. The outside enclosure wall of a container made from blank 100 would be formed by the serially connected outside left side wall 123, outside rear end wall 122, outside right side wall 121, and outside front end wall 124. Hingedly attached along the right edge of outside front end wall 124 is glue flap 125. Bend or spacer panels 145 through 148, similar to spacer panels 35 through 48 described above with regard to blank 10, are hingedly attached to outside side and end walls 121 through 124, respectively, and are formed by the spaced transverse fold or score lines 120 and 130. Inside side walls 131 and 133 correspond substantially to side walls 31 and 33 of the above-described blank 10, as do inside end walls 132 and 134 with inside end walls 32 and 34. Again, optional inner bottom walls 142 and 144 are hingedly attached along transverse score line 140 to inside end walls 132 and 134, respectively.

Blank 100 would erected in a substantially standard manner by folding blank 100 about fold line 181 and adhesively joining the inner surface of glue flap 125 to the outer surface of outside side wall 123. Following formation of this construction joint, a substantially rectangular tube is formed by bending the blank 100 about fold lines 182 and 183, respectively. Inner bottom flaps 115 and 117 are then folded inwardly about fold line 114, and then outer bottom flaps 116 and 118 are folded inwardly about fold line 114 and adhesively joined to inner flaps 115 and 117. At this time, the partially erected container is ready for insertion of the bag-like moisture proof structure, as described and illustrated above with regard to FIG. 3. The balance of the folding operations to complete the erection of blank 100 is substantially the same as that described above with regard to blank 10.

Several advantages can be gained by utilizing blank 100 as shown. In particular, the outside corners between outside walls 124 and 121, 121 and 122, and 122 and 123 will be inherently stronger as they are formed from a continuous piece of the carton blank 100. Additionally, a continuous tear tab, such as described with regard to tear tab 61 above, can be more easily formed about the outside enclosure wall of the container resulting from erection of blank 100 because of the continuous nature of wall panels 121 through 124. Erection procedures may also be simplified by utilization of blank 100 as shown in FIG. 6, as conventional, high-speed equipment may be more easily employed.

Various modifications of the described invention will be apparent to those skilled in the art without departing from the substance of the subject invention. Some of these alternative have been mentioned above, such as alternate means of providing support for the inner and outer enclosure walls of the container, and for providing access to the moisture proof structure closed within such enclosures. Additionally, for example, enhanced bottom strength might be obtained in container 60 by rigidly attaching inner bottom wall panels 42 and 44 to bottom wall panel 15, such as by stapling or the like (e.g. staples 75 shown in FIG. 4). While such staples might tend to compromise the moisture proof characteristics of the lower end 51 of bag-like structure 50, the contained cat litter or similar material and the several layers of bottom walls and the lower end 51 of the bag-like structure should provide sufficient moisture retention. While the disposable container described herein is especially applicable to use as a cat litter container, its features would also be applicable to nearly any application in which it is desirable to enclose the container and its contained material for disposal, shipping, storage, or the like, without having to contact such contained material or the inner portions of the container. Accordingly, the scope of the present invention should be considered in terms of the following claims, and is understood not to be limited to the details of structure and operation described and shown in the specification and drawings.

I claim:

1. A disposable container for cat litter and the like, said container comprising:
   (a) a bottom wall;
   (b) a pair of oppositely disposed inside end walls and a pair of oppositely disposed inside side walls, said inside end and side walls forming an upstanding, substantially continuous inner enclosure wall about the periphery of said bottom wall;
   (c) a pair of oppositely disposed outside end walls and a pair of oppositely disposed outside side walls, said outside end and side walls corresponding to said inside end and side walls, and forming an upstanding substantially continuous outer enclosure wall about the outer periphery of said inner enclosure wall, said inner and outer enclosure walls forming a substantially open-top, box-like structure with said bottom wall;
   (d) a bag-like moisture proof structure having an open upper edge, a closed lower end, and flexible side walls, said closed lower end covering said bottom wall within said substantially open top box-like structure, and said flexible side walls and open upper edge being substantially enclosed between said inner and outer enclosure walls about the periphery of said closed lower end covering said bottom wall; and
   (e) access means for opening said outer enclosure wall, whereby said open upper edge and upper portions of said flexible side walls of said bag-like structure may be withdrawn about the periphery of said open top to provide a moisture proof enclosure of said container and its contents.

2. The disposable container of claim 1, wherein said open-top, box-like structure is formed from a unitary blank of material.

3. The disposable container of claim 1, wherein said access means comprises a removable tear-tape or the like which provides an access opening about substantially the entire periphery of said outer enclosure wall adjacent said open top of the container.

4. The disposable container of claim 3, wherein said tear-tape comprises a continuous tear-out strip about substantially the entire upper periphery of said outer enclosure wall.

5. The disposable container of claim 1, said container further comprising a removable lid structure substantailly covering the open top of said box-like structure.

6. The disposable container of claim 5, said container further comprising a predetermined amount of cat litter material within said box-like structure.

7. The disposable container of claim 1, said container further comprising an inner bottom wall overlying said closed lower end of said bag-like structure covering said bottom wall.

8. A disposable container for cat litter and the like, said container comprising:
   (a) a bottom wall panel having oppositely disposed front and rear edges and oppositely disposed side edges;
   (b) a pair of oppositely disposed outside end walls integrally hinged to said bottom wall panel along said front and rear edges, respectively;
   (c) a pair of oppositely disposed outside side walls integrally hinged to said bottom wall panel along said side edges, respectively;
   (d) a pair of inside end walls and a pair of inside side walls, each being integrally hinged to the distal edge of a corresponding outside end or side wall, respectively;
   (e) means for securing said outside and inside end and side walls in upright position to thereby provide substantially continuous outer and inner enclosure walls about the periphery of said bottom wall panel to form a substantially open-top box-like structure;
   (f) a bag-like moisture proof structure having an open upper edge, a closed lower end, and flexible side walls, said closed lower end covering said bottom wall within said substantially open top box-like structure, and said flexible walls and open upper edge being substantially enclosed between said inner and outer enclosure walls about the periphery of said closed lower end covering said bottom wall panel; and
   (g) access means for opening said outer enclosure wall, whereby said open edge and upper portions of said flexible side walls of said bag-like structure may be withdrawn about the periphery of said open top to provide a moisture proof enclosure of said container and its contents.

9. The disposable container of claim 8, wherein said access means comprises a removable tear-tape or the like which provides an access opening about substantially the entire periphery of said outer enclosure wall adjacent said open top of the container.

10. The disposable container of claim 9, wherein said tear-tape comprises a continuous tear-out strip about substantially the entire upper periphery of said outer enclosure wall.

11. The disposable container of claim 8, said container further comprising a removable lid structure substantially covering the open top of said box-like structure.

12. The disposable container of claim 11, said container further comprising a predetermined amount of cat litter material within said box-like structure.

13. The disposable container of claim 8, said container further comprising an inner bottom wall overlying said closed lower end of said bag-like structure covering said bottom wall panel.

14. A disposable container for cat litter and the like, said container comprising;
   (a) a bottom wall panel having oppositely disposed front and rear edges and oppositely disposed side edges;
   (b) a pair of oppositely disposed outside end walls integrally hinged to said bottom wall panel along said front and rear edges, respectively;
   (c) a pair of oppositely disposed outside side walls integrally hinged to said bottom wall panel along said side edges, respectively;
   (d) a pair of inside end walls and a pair of inside side walls, each being integrally hinged to the distal edge of a corresponding outside end or side wall, respectively;
   (e) means for securing said outside and inside end and side walls in upright position to thereby provide substantially continuous outer and inner enclosure walls about the periphery of said bottom wall panel to form a substantially open-top box-like structure;
   (f) a bag-like moisture proof structure having an open upper edge, a closed lower end, and flexible side walls, said closed lower end covering said bottom wall panel within said substantially open top box-like structure, and said flexible walls and open upper edge being disposed between said inner and outer enclosure walls about the periphery of said closed lower end covering said bottom flap wall panel;
   (g) a removable lid structure substantially covering the open top of said box-like structure; and
   (h) access means for opening said outer enclosure wall, said access means comprising a removable tear-tape or the like which provides an access opening about substantially the entire upper periphery of said outer enclosure wall, whereby upon opening said outer enclosure wall said open upper edge and upper portions of said flexible side walls of said bag-like structure may be withdrawn about the periphery of said open top to provide a moisture proof enclosure of said container and its contents.

15. The disposable container of claim 14, wherein said tear-tape comprises a continuous tear-out strip about substantially the entire upper periphery of said outer enclosure wall.

16. The disposable container of claim 14, said container further comprising a predetermined amount of cat litter material within said box-like structure.

17. The disposable container of claim 14, said container further comprising an inner bottom wall overlying said closed lower end of said bag-like structure covering said bottom wall panel.

18. The disposable container of claim 14, said container further comprising opening means for facilitating removal of said removable lid structure.

19. The disposable container of claim 18, wherein said opening means comprises a pull-string designed to detach said lid structure from said box-like structure adjacent said open top thereof.

20. The disposable container of claim 14, wherein said open-top, box-like structure is formed from a unitary blank of material.

* * * * *